United States Patent Office 3,127,422
Patented Mar. 31, 1964

3,127,422
REACTION PRODUCT OF MONOAMINO-DI-
BENZANTHRONE AND TWO MOLES OF A
HYDROXYALKYLAMINE
Max Staeuble, Basel, Switzerland, assignor to Ciba
Limited, Basel, Switzerland, a company of Switzerland
No Drawing. Filed Jan. 31, 1961, Ser. No. 85,970
Claims priority, application Switzerland Feb. 3, 1960
1 Claim. (Cl. 260—354)

This invention is based on the observation that valuable vat dyestuffs are obtained by reacting aminodibenzanthrones with hydroxyalkylamines.

The term "aminodibenzanthrones" is used herein to include amines of dibenzanthrone proper and of isodibenzanthrone, for example, the diamines and especially the monamines. These amines can be obtained in known manner by the reduction of nitrodibenzanthrones obtainable by the nitration of dibenzanthrone or isodibenzanthrone, for example, in chloracetic acid or sulphuric acid (see, for example, U.S. Patents Nos. 1,093,427 and 2,029,237, Example 2).

As a starting material there is also included within the above definition an aminodibenzanthrone which contains a varying nitrogen content depending on the process by which it has been obtained.

As hydroxyalkylamines there are advantageously used those containing a primary amino group and 2 to 8 carbon atoms, and which may contain straight or branched alkyl radicals. As examples there may be mentioned the hydroxyalkylamines of the following formulae:

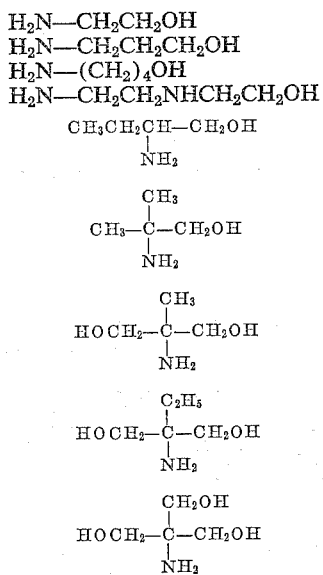

$H_2N-CH_2CH_2OH$ $H_2N-CH_2CH_2CH_2OH$ $H_2N-(CH_2)_4OH$ $H_2N-CH_2CH_2NHCH_2CH_2OH$ $$CH_3CH_2\underset{\underset{NH_2}{|}}{CH}-CH_2OH$$

$$CH_3-\underset{\underset{NH_2}{|}}{\overset{\overset{CH_3}{|}}{C}}-CH_2OH$$

$$HOCH_2-\underset{\underset{NH_2}{|}}{\overset{\overset{CH_3}{|}}{C}}-CH_2OH$$

$$HOCH_2-\underset{\underset{NH_2}{|}}{\overset{\overset{C_2H_5}{|}}{C}}-CH_2OH$$

$$HOCH_2-\underset{\underset{NH_2}{|}}{\overset{\overset{CH_2OH}{|}}{C}}-CH_2OH$$

In the process of the invention there is used at least one molecular proportion, for example, at least two molecular proportions and advantageously at least five molecular proportions, of the hydroxyalkylamine for each molecular proportion of the aminodibenzanthrone. The reaction is advantageously carried out in an inert high boiling solvent or diluent, for example, nitrobenzene, dimethyl-formamide or dimethyl sulphoxide. Instead of a solvent there may be used a large excess, for example, 10 to 20 times the weight, of the hydroxyalkylamine. The reaction is advantageously carried out at a raised temperature, for example, at a temperature within the range of 100° C. to 240° C., and especially 140° to 220° C.

An especially simple form of the process consists in preparing the aminodibenzanthrone to be used as starting material by reducing the corresponding nitrodibenzanthrone in the same vessel as that in which the subsequent reaction with the hydroxyalkylamine is carried out. In this case it is of advantage to use a reducing agent, for example, phenyl-hydrazine, which is soluble in the organic solvent.

As starting material there may also be used a nitrodibenzanthrone which has a varying content of nitrogen depending on the process by which it has been made.

After the reaction, the reaction mixture is introduced into water, advantageously after removing the solvent and/or the unreacted hydroxyalkylamine by distillation under reduced pressure. The dyestuff which is thus precipitated may have been slightly reduced during the reaction to the leuco-form, so that it is then desirable to oxidize the dyestuff by introducing air. The dyestuff can be isolated by filtration.

The products of the process are valuable vat dyestuffs which are useful for dyeing or printing a very wide variety of materials, especially cellulose fibres. The dyestuffs yield dyeings or prints, which, without after-treatment, have blue or black tints of the kind that can otherwise be obtained only with dyestuffs of more complex constitution.

The following examples illustrate the invention, the parts and percentages being by weight:

Example 1

80 parts of 2-amino-ethanol are heated to 160° C., and then 4.7 parts of aminodibenzanthrone are introduced in small portions while stirring. The whole is further stirred for two hours at 165° to 170° C., and then introduced into 500 parts of ice-water. By blowing a stream of air into the mixture for about one hour the partially vatted dyestuff is re-oxidized and can then be isolated by filtration. The filter residue is first washed with water and then with acetone and dried at 70° C. in vacuo.

The new dyestuff dissolves in concentrated sulphuric acid with a blue coloration, in contradistinction to aminodibenzanthrone which dissolves in concentrated sulphuric acid with a violet coloration.

While aminodibenzanthrone dyes cotton green tints, the new dyestuff dyes cotton and regenerated cellulose from a violet hydrosulphite vat directly, that is to say, without after-treatment with bleaching powder, grey to deep black tints having excellent properties of wet fastness and excellent fastness to light.

Example 2

4.7 parts of aminodibenzanthrone, 95 parts of dimethylformamide and 5 parts of 2-amino-ethanol are heated for 10 hours at 190° C. in an autoclave provided with stirring means. The mixture is then poured onto water, air is blown through the mixture, and the dyestuff is isolated and dried as described in Example 1.

There is obtained a vat dyestuff which yields black dyeings and which is identical with regard to its tinctorial and fastness properties with the dyestuff of Example 1.

By using in this example, instead of 95 parts of dimethyl-formamide, 80 parts of pyridine, and using 20 parts of 2-amino-ethanol, there is likewise obtained a vat dyestuff yielding black dyeings.

Example 3

The same black vat dyestuff as that described in Examples 1 and 2 can also be obtained by using nitrodibenzanthrone as starting material and working in the same vessel as follows:

5.0 parts of finely ground nitrodibenzanthrone, obtainable by nitrating dibenzanthrone in chloracetic acid, are suspended in 150 parts of dimethyl-formamide in an autoclave provided with stirring means, and then 3.7 parts of phenylhydrazine are added. The whole is heated to 150 to 160° C., while stirring, and the benzene produced by the reduction is distilled off. After stirring the mixture for one hour at 150 to 160° C. 7.5 parts of 2-amino-ethanol are added, then the autoclave is closed, and the whole is heated for 10 hours at 170 to 175° C. while stirring. After being cooled the reaction mixture is poured on to 750 parts of water, oxidized with air, and the dyestuff is isolated and dried as described in Example 1.

*Example 4*

4.7 parts of aminobenzanthrone are heated in 80 parts of 2-amino-ethanol for one hour under reflux. The excess of 2-amino-ethanol is then cautiously distilled off in vacuo until the residue is almost dry and the residue is taken up in 200 parts of water and oxidized with air. The black vat dyestuff can then be isolated and dried as described in Example 1.

*Example 5*

90 parts of 2-amino-ethanol are heated to 160° C. and 4.7 parts of N-methylamino-dibenzanthrone are introduced in small portions while stirring. The whole is stirred for a further hour at 160 to 170° C., and then the reaction mixture is poured on to 500 parts of ice-water.

The product is worked up as described in Example 1, there is obtained a dyestuff which dyes cotton and regenerated cellulose from a violet hydro-sulphite vat brown-black tints having excellent properties of fastness.

*Example 6*

4.7 parts of aminoisodibenzanthrone are introduced in small portions into a boiling mixture of 50 parts of dimethylformamide and 50 parts of 2-amino-ethanol, while stirring well, and then the whole is refluxed for two hours. The reaction mixture is then introduced into 1000 parts of ice-water, and oxidised by means of a current of air for one hour. The new dyestuff can then be isolated by filtration, washed with water and then with acetone, and dried at 70° in vacuo.

The dyestuff so obtained dyes cotton and regenerated cellulose from a blue vat pure red-blue tints having excellent properties of fastness.

*Example 7*

10 parts of aminodibenzanthrone are heated in 90 parts of dimethyl-formamide with 12 parts of 2-(2′-amino-ethyl-amino)-ethanol for 8 hours at 190° C. in an autoclave provided with stirring means. After being cooled the reaction mixture is diluted with 1000 parts of water and air is blown through the mixture for one hour. The precipitated dyestuff is then isolated by filtration, washed with water and then with methanol and dried at 80° C. in vacuo.

The dyestuff so obtained dyes cotton and regenerated cellulose from a blue hydrosulphite vat deep black tints having excellent properties of fastness.

*Example 8*

4.7 parts of aminodibenzanthrone are heated in 50 parts of dimethyl-formamide with 5 parts of 4-amino-butanol for 10 hours at 180° C. in an autoclave provided with stirring means. After being cooled the reaction mixture is poured on to water and oxidised with a current of air. The precipitated dyestuff is then isolated by filtration, washed first with water and then with acetone, and dried at 80° C. in vacuo.

The dyestuffs so obtained dyes cotton and regenerated cellulose from a blue hydrosulphite vat deep black tints having excellent properties of fastness.

By using in this example, instead of the 4-amino-butanol, 5 parts of 3-amino-propanol there is obtained a dyestuff having similar properties.

*Example 9*

4.7 parts of aminodibenzanthrone are boiled under reflux for 3 hours, while stirring well, in a mixture of 50 parts of dimethyl-formamide and 50 parts of 2-amino-1-butanol. The whole is then poured on to 1000 parts of ice-water and the dyestuff is oxidized with air and isolated as described in Example 6.

The new dyestuff dyes cotton and regenerated cellulose from a reddish-blue hydrosulphite vat greenish-grey to black tints having excellent properties of fastness.

*Example 10*

7.4 parts of aminodibenzanthrone are heated in 50 parts of dimethyl-formamide and 10 parts of 2-amino-2-methyl-1-propanol for 10 hours at 190 to 195° C. in an autoclave provided with stirring means. After being cooled the reaction mixture is diluted with 1000 parts of water and air is blown through the mixture for one hour. The precipitated dyestuff is then isolated by filtration, washed first with water and then with methanol, and dried in vacuo at 80° C.

The dyestuff so obtained dyes cotton and regenerated cellulose black tints having excellent properties of fastness.

*Example 11*

4.7 parts of aminodibenzanthrone are heated with 50 parts of dimethyl-formamide and 10 parts of 2-amino-2-methyl-1:3-propane-diol of the formula

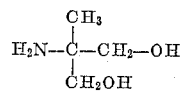

in an autoclave in the manner described in Example 9 and the dyestuff is isolated.

It dyes cotton and regenerated cellulose grey to black tints having excellent properties of fastness.

By using in this example, instead of 2-amino-2-methyl-1:3-propane-diol, 10 parts of 2-amino-2-ethyl1:3-propane-diol of the formula

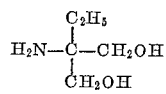

or 10 parts of tris-(hydroxy-methyl)-aminomethane of the formula

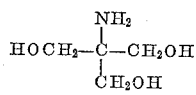

there are likewise obtained vat dyestuffs that yield black dyeings having very good properties of fastness.

*Example 12*

5.0 parts of nitro-dibenzanthrone(nitrogen content= 2.71%) are heated in 100 parts of dimethyl-formamide with 5.5 parts of phenyl-hydrazine slowly to 150° C., while stirring. The whole is heated for one hour at 150 to 155° C., during which benzene and water distil off. The mixture is then poured on to water, and the aminodibenzanthrone is isolated by filtration, thoroughly washed with alcohol, and the well pressed suction filter cake is introduced in small portions into 80 parts of 2-amino-ethanol having a temperature of 160 to 165° C. The whole is stirred under reflux for a further two hours, and then the mixture is poured on to 500 parts of ice-water by blowing air through the mixture for about one hour. The partially reduced dyestuff is reoxidized, and can then be isolated by filtration. The suction filter residue is first washed with water and then with methanol or acetone, and the dyestuff is dried at 70 to 80° C. in vacuo.

It dyes cotton and regenerated cellulose from an alkaline hydrosulphite vat blue-grey to black tints having excellent properties of fastness.

By using in this example, instead of the nitro-dibenzanthrone having a nitrogen content of 3.70% there is obtained a dyestuff which yields somewhat more reddish grey to block tints having the same properties of fastness.

What we claim is:

The product produced by heating at a temperature within the range of 100° to 240° C. one molecular proportion of monoamino-dibenzanthrone with at least two molecular proportions of a hydroxyalkyl monoamine, whose amino group is primary and which contains 2 to 8 carbon atoms, in the presence of a solvent selected from the group consisting of an excess of the hydroxyalkyl monoamine and an inert high boiling organic solvent, said aminodibenzanthrone being the reduction product of a nitrodibenzathrone obtained by the nitration of dibenzanthrone.

References Cited in the file of this patent
UNITED STATES PATENTS

| | | |
|---|---|---|
| 2,092,397 | Koeberle et al. | Sept. 7, 1937 |
| 2,131,712 | Schoeller et al. | Sept. 27, 1938 |
| 2,563,144 | Wilder | Aug. 7, 1951 |